3,028,423
REACTIONS OF ALKALI METAL ACETYLIDES
Jack H. Blumenthal, Plainfield, N.J., assignor to Air Reduction Company, Incorporated, New York, N.Y., a corporation of New York
No Drawing. Filed Feb. 25, 1957, Ser. No. 641,798
12 Claims. (Cl. 260—533)

This invention relates to certain improvements in the reactions of alkali metal acetylides with organic compounds reactable therewith. More particularly, this invention is concerned with the reaction of an alkali metal acetylide and another organic compound reactable therewith in a liquid organic sulfoxide. Still more specifically, this invention relates to (1) the preparation of acetylenic alcohols by the reaction of an alkali metal acetylide and a carbonyl compound in a liquid organic sulfoxide; (2) the preparation of acetylenic alcohols by the reaction of an alkali metal acetylide and an alkylene oxide in a liquid organic sulfoxide; (3) the preparation of acetylenic hydrocarbons by the reaction of an alkali metal acetylide and an alkyl halide in a liquid organic sulfoxide; and (4) the preparation of acetylenic carboxylic acids by the reaction of an alkali metal acetylide and carbon dioxide in a liquid organic sulfoxide.

Previously, various methods have been proposed for carrying out reactions of alkali metal acetylides with organic compounds reactable therewith. These methods differ primarily in the reaction media suggested. Certain organic solvents such as ethers and polyethers, e.g. methylal and dioxane, have been suggested as suitable reaction media for conducting these reactions. However, such organic solvents, heretofore, have been unsatisfactory due to the poor yields and conversions obtainable therewith because of undesirable side reactions which occur. For example, in the reaction of an alkali metal acetylide and a carbonyl compound, there is a possibility for the carbonyl compound to polymerize or be subjected to aldolization, and since the rate of reaction obtainable in the organic solvent media previously proposed was slow, these undesirable side reactions could occur. Similarly, in other reactions of alkali metal acetylides and organic compounds reactable therewith, such as alkylene oxides, difficulty was encountered in obtaining adequate yields of desired product when the reaction was conducted in the organic solvent reaction media previously suggested. The reaction, for example, of an alkali metal acetylide and an alkyl halide to prepare acetylenic hydrocarbons proceeded with such difficulty in the organic solvents previously suggested as reaction media, that it was necessary to employ expensive alkyl bromides to effect the reaction and the more economic alkyl chlorides could not be successfully employed. It has also been suggested that the reactions of alkali metal acetylides be conducted in liquid ammonia. While this has generally resulted in improved yields of desired products obtainable from alkali metal acetylides, the use of liquid ammonia is hazardous and inconvenient. Liquid ammonia is difficult to handle and maintain in liquid form, and usually requires the use of superatmospheric pressures or considerable cooling. The overall requirements of maintaining low temperatures and/or high pressures result in economic disadvantages in the use of liquid ammonia as the medium for conducting reactions of alkali metal acetylides.

An object of this invention is to provide an efficient and economic method for conducting reactions of an alkali metal acetylide and an organic compound reactable therewith. Another object is to provide an improved process for the preparation of acetylenic derivatives by the reaction of an alkali metal acetylide and an organic compound. A further object is to provide an improved process for the preparation of acetylenic alcohols by the reaction of an alkali metal acetylide and a carbonyl compound. A still further object is to provide an improved process for the preparation of an acetylenic alcohol by the reaction of an alkali metal acetylide and an alkylene oxide. Still another object is to provide an improved process for the preparation of acetylenic hydrocarbons by the reaction of an alkali metal acetylide and an alkyl halide. Another object is to provide an improved process for the preparation of acetylenic carboxylic acids by the reaction of an alkali metal acetylide with carbon dioxide. A still further object is to provide a suitable reaction medium for conducting the reactions of alkali metal acetylides in a simple, easy, and efficient manner. Still other objects will appear in, or be obvious from, the following description.

In accordance with the present invention, it has been found that if a reaction of an alkali metal acetylide is conducted in an organic sulfoxide reaction medium, the acetylenic derivatives prepared thereby can be obtained in high yields and conversions with a minimum of undesirable side reactions, such as polymerization, hydrogenation, and aldolization, and the reaction may be conducted in a simple, economic, efficient, and non-hazardous manner. The organic sulfoxides, which have been found suitable as the medium for conducting reactions of alkali metal acetylides, are those organic sulfoxides which are liquid at reaction temperatures and contain no functional or reactive groups. The preferred liquid organic sulfoxide reaction media may be designated by the formula

wherein R and $R_1$ are the same or different alkyl radicals or may be methylene groups which are bonded together through two or more methylene groups to form a ring structure, as in tetramethylene sulfoxide. Suitable organic liquid sulfoxides include dimethyl sulfoxide, diethyl sulfoxide, methyl ethyl sulfoxide, tetramethylene sulfoxide and the like; although dimethyl sulfoxide is preferred. The liquid organic sulfoxide reaction media should be substantially anhydrous, i.e., preferably contain less than about 0.01% water by weight, since the alkali metal acetylide is capable of reacting with any free water present to form an alkali metal hydroxide, and such alkali hydroxides would favor aldol condensation reactions, an undesired reaction which must be particularly avoided where carbonyl compounds are employed.

The present invention is applicable to any reaction of an alkali metal acetylide and an organic compound reactable therewith, and an organic liquid sulfoxide may be advantageously employed as the reaction medium for any such reaction. The term "alkali metal acetylide" as used herein and in the appended claims is intended to refer to any alkali metal derivative of an acetylenic hydrocarbon and may be represented by the general formula M—C≡C—$R_2$ wherein M is an alkali metal such as sodium, potassium, lithium, etc., and $R_2$ is hydrogen or a hydrocarbon radical such as alkyl (e.g. methyl, ethyl, propyl, butyl, etc.), alkenyl (e.g. vinyl, allyl, etc.), and aryl (e.g. phenyl, xylyl, etc.), or an alkoxy-substituted hydrocarbon group such as —$CH_2$—O—$CH_3$,

—$CH_2$—O—$C_3H_7$

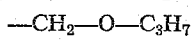

—$C_2H_4$—O—$CH_3$, —$C_3H_6$—O—$C_2H_5$, and the like. The organic compounds which may be reacted with an alkali metal acetylide include a variety of different materials. For example, carbonyl compounds such as aldehydes or ketones may be reacted with an alkali metal acetylide to prepare acetylenic alcohols, alkylene oxides may also be reacted with an alkali metal acetylide to prepare acetylenic alcohols; alkali metal acetylides may be reacted with an alkyl halide to obtain acetylenic hydrocarbons; and carbon dioxide may be reacted with an alkali metal acetylide to prepare acetylenic acids. Still other reactions of alkali metal acetylides are well-known and would readily suggest themselves to those skilled in the art. The essential feature of this invention resides in the discovery that these reactions of an alkali metal acetylide can be remarkably improved by conducting them in a liquid organic sulfoxide reaction medium.

The carbonyl compounds which are reactable with an alkali metal acetylide to prepare acetylenic alcohols may be represented by the general formula $$R_3-\underset{\underset{O}{\|}}{C}-R_4$$

wherein each of $R_3$ and $R_4$ may be hydrogen or a hydrocarbon radical such as alkyl, aryl, alkenyl, cycloalkyl, and cycloalkenyl. Suitable carbonyl compounds include formaldehyde, acetaldehyde, propionaldehhyde, butyraldehyde, furfural, benzaldehyde, crotonaldehyde, acetone, methyl ethyl ketone, hexanone, acetophenone, benzophenone, cyclohexanone and the like. Carbonyl compounds containing other functional groups, such as carboxyl or hydroxyl groups, may be utilized but, generally, this will necessitate the use of greater amounts of alkali metal acetylides and the probability of side reactions would increase. Accordingly, it is preferred to have $R_3$ and $R_4$ in the formula given above represent unsubstituted hydrocarbon radicals.

Generally, the reaction of an alkali metal acetylide and a carbonyl compound is conducted by suspending or otherwise dispersing the alkali metal acetylide in the organic liquid sulfoxide reaction medium, bringing this mixture to the reaction temperature, and then the carbonyl compound is added. After the reaction has been completed, the reaction mixture is hydrolyzed (e.g., by the addition of an aqueous acid solution), and the acetylenic alcohol reaction product is separated. Alternatively, the alkali metal acetylide may be added to a solution of the carbonyl compound in the liquid organic sulfoxide reaction medium. The overall equation for this reaction may be written as follows:

(I)
$$R_3-\underset{\underset{O}{\|}}{C}-R_4 + MC\equiv C-R_2 + H_2O \longrightarrow R_3-\underset{\underset{OH}{|}}{\overset{\overset{R_4}{|}}{C}}-C\equiv C-R_2 + MOH$$

The alkyl halides which are reactable with an alkali metal acetylide to prepare an acetylenic hydrocarbon may be represented by the general formula $R_5X$, wherein X represents a halide such as fluorine, chlorine, bromine or iodine and $R_5$ designates an alkyl radical such as methyl, ethyl, propyl, butyl, and the like. Since alkyl iodides and fluorides are normally more expensive than the corresponding bromides and chlorides, it is preferred to use alkyl bromides or alkyl chlorides. Suitable alkyl halide reactants include methyl chloride, ethyl bromide, butyl bromide, ethyl fluoride, propyl chloride, and methyl iodide.

Generally, the reaction of an alkyl halide and alkali metal acetylide to prepare an acetylenic hydrocarbon is conducted by suspending or otherwise dispersing the alkali metal acetylide in the organic liquid sulfoxide reaction medium, bringing this mixture to the reaction temperature, adding the alkyl halide to the mixture, reacting the mixture and separating the acetylenic hydrocarbon reaction product. Alternatively, both of the reactants may be dispersed in the reaction medium prior to starting the reaction, or the acetylide can be added to a mixture of the alkyl halide in liquid organic sulfoxide. Not much difficulty is normally encountered with undesirable side reactions, although dehydrohalogenation is possible. Where such a side reaction is a problem, it can usually be overcome by careful addition of the alkyl halide to the reaction mixture. The overall equation for this reaction may be written as follows:

(II)    $R_5X + MC\equiv CR_2 \rightarrow R_5C\equiv CR_2 + MX$

The alkylene oxides which are reactable with an alkali metal acetylide to prepare an acetylenic alcohol in accordance with this invention may be represented by the general formula $$\underset{R_7}{\overset{R_6}{\diagdown}}C\underset{\diagdown O \diagup}{\text{———}}C\underset{R_9}{\overset{R_8}{\diagup}}$$

wherein $R_6$, $R_7$, $R_8$, and $R_9$ designate hydrogen or a hydrocarbon radical such as alkyl, cycloalkyl, aryl, and aralkyl. Examples of suitable alkylene oxides are ethylene oxide, propylene oxide, butylene oxide, α,α-dimethylethylene oxide, isopropylethylene oxide, α-methyl-α-ethylethylene oxide, trimethylene oxide, diethylethylene oxide, styrene oxide, and cyclohexylethylene oxide, etc. Since the presence of functional groups, such as carboxyl or hydroxyl groups, in the alkylene oxide requires the use of larger amounts of alkali metal acetylide, it is preferred that unsubstituted alkylene oxides be employed.

Generally, the reaction of an alkylene oxide and alkali metal acetylide to prepare an acetylenic alcohol is conducted by suspending or otherwise dispersing the alkali metal acetylides in the organic liquid sulfoxide reaction medium, bringing the mixture to the reaction temperature, and then adding the alkylene oxide. After the reaction has been completed, the reaction mixture is hydrolyzed by the addition of a dilute acid solution, and the acetylenic alcohol reaction product is separated. In a less preferred manner, the alkali metal acetylide may be added to a solution of the oxide in the liquid organic sulfoxide reaction medium. The equation for this reaction may be written as a two step reaction as follows:

(III)

(a) $MC\equiv CR_2 + \underset{R_7}{\overset{R_6}{\diagdown}}C\underset{\diagdown O \diagup}{\text{———}}C\underset{R_9}{\overset{R_8}{\diagup}} \longrightarrow MO-\underset{\underset{R_9}{|}}{\overset{\overset{R_8}{|}}{C}}-\underset{\underset{R_7}{|}}{\overset{\overset{R_6}{|}}{C}}-C\equiv CR_2$ (b) $MO-\underset{\underset{R_9}{|}}{\overset{\overset{R_8}{|}}{C}}-\underset{\underset{R_7}{|}}{\overset{\overset{R_6}{|}}{C}}-C\equiv CR_2 \xrightarrow{H_2O} HO-\underset{\underset{R_9}{|}}{\overset{\overset{R_8}{|}}{C}}-\underset{\underset{R_7}{|}}{\overset{\overset{R_6}{|}}{C}}-C\equiv CR_2$ In accordance with this invention, carbon dioxide can be reacted with alkali metal acetylide in liquid organic sulfoxide reaction medium to prepare acetylenic acids. Both acetylenic mono- and di-carboxylic acids can be prepared. The equation for the overall reaction may be written as follows:

(IV)
$$MC\equiv CR_2 + CO_2 \xrightarrow[\text{acid}]{\text{aqueous}}$$
$$HO-\overset{O}{\overset{\|}{C}}-C\equiv CR_2 + HO-\overset{O}{\overset{\|}{C}}-C\equiv C-\overset{O}{\overset{\|}{C}}-OH$$

Generally the reaction of carbon dioxide with alkali metal acetylide to prepare acetylenic carboxylic acids is conducted by suspending or otherwise dispersing the alkali metal acetylide in the organic liquid sulfoxide reaction medium, adjusting the temperature of this mixture to a suitable reaction temperature, and then adding the carbon dioxide. Less preferably, the reactants may be added simultaneously to the sulfoxide reaction medium. In the reaction, the alkali metal salts of the acetylenic acids are formed. A major portion of these salts can be directly separated from the reaction mixture as solids by filtering the reaction mixture. Additional amounts of the salts can be precipitated from the reaction mixture by the addition thereto of a material in which the salts are substantially insoluble, e.g. acetone. Acetylenic acids can be obtained from the alkali metal salts thereof by acidification with aqueous mineral acid followed by extraction with a solvent such as ether. Less preferably, the acetylenic acids can be obtained from the alkali metal salts thereof by directly acidifying the reaction mixture resulting from the reaction of this invention.

Both acetylenic mono- and di-carboxylic acids can be formed in practice of the invention. Dicarboxylic acids are formed only when the reacting alkali metal acetylide has the formula $MC \equiv CH$ where M is alkali metal; greatly increased conversions of these alkali metal acetylides to acetylenic dicarboxylic acids are obtained by this invention than could be obtained by prior art procedures. The mono- and di-carboxylic acids can be separated by esterifying the acids and separating the resulting esters by distillation.

The temperature range for conducting a reaction of an alkali metal acetylide and an organic compound reactable therewith in a liquid organic sulfoxide reaction medium would depend upon a variety of factors including the specific reactants employed and the particular liquid organic sulfoxide employed. Generally, the reaction may be conducted at a temperature between the freezing point of the liquid organic sulfoxide and about 80° C. However, it will be understood that it is possible to operate below the normal freezing point of the organic sulfoxide by supercooling the reaction mixture. The proper operating temperature range can be readily determined by those skilled in the art. An example of this would be the utilization of dimethyl sulfoxide as the reaction medium. Dimethyl sulfoxide, molecular weight 78.13, is a clear, water white, very hygroscopic liquid, having a melting point of 18.4° C., and a boiling point of 189° C. Thus, when used as a reaction medium the reaction temperature range, excluding pressure operations, would apparently be from about 18° C. to 80° C. By supercooling dimethyl sulfoxide, however, and due to the freezing point depressive effect of the reactants, the reactions in dimethyl sulfoxide can be conducted at temperatures as low as 5° C., while the dimethyl sulfoxide is still maintained in liquid form. It is apparent that in many cases it would be advantageous to operate in the lower temperature range, but the most convenient or optimum temperature may be determined by one skilled in the art by studying and balancing the rate of reaction, undesirable side reactions and other similar factors. It has been found that 80° C. is the practical upper temperature limit, since at temperatures much above about 80° C. it is possible to obtain an interreaction of the alkali metal acetylide and liquid organic sulfoxide. Generally, it is preferred to conduct the reaction at temperatures below about 60° C.; however, in the case where relatively unreactive organic compounds are employed, there may be some advantage, in order to increase reaction rates, to operate above 60° C. for short periods of time.

Although broad temperature ranges have been given where my invention may be conducted to yield satisfactory results, it has been found that certain specific temperature ranges are more advantageous. For the reaction of alkali metal acetylide and a carbonyl compound it is preferred to use a temperature between about 0° C. to about 35° C.; for the lower molecular weight carbonyl compounds (e.g., acetone, acetaldehyde) a temperature in the range of about 0°–15° C. is preferable and for the higher molecular weight carbonyl compounds (e.g. acetophenone, benzaldehyde) a temperature in the range of about 20°–35° C. is preferred. In the reaction of an alkali metal acetylide with an alkyl halide it has been found that a reaction temperature of from about 20°–30° C. is preferred, although higher temperatures may be more suitable for the less reactive alkyl halides. It has also been found that a temperature of from 20° to 30° C. is preferred for the reaction of an alkali metal acetylide with an alkylene oxide. Temperatures in the range of about 0°–25° C. are preferred for the reaction of carbon dioxide with an alkali metal acetylide.

Generally, the reactants are used in stoichiometric amounts in accordance with Equations I, II, III, and IV given above, for example. In some cases, however, it may be desirable to use a slight excess of one or the other of the reactants. The amount of liquid organic sulfoxide used should be sufficient to maintain both the reactants and reaction products suitably dispersed in the liquid organic sulfoxide reaction medium. Since the liquid organic sulfoxide is normally expensive and must generally be separated from the reaction products, recovered and recycled, it is usually desirable to employ a minimum amount of said liquid organic sulfoxide. It has been found, for example, that in the reaction with a carbonyl compound one mole of alkali metal acetylide requires about 400 cc. or 5.7 moles of organic liquid sulfoxide; the reaction with alkyl halide requires about one liter of liquid organic sulfoxide per 0.7 to 2.0 moles of alkali metal acetylide; the reaction with alkylene oxides requires about 9.3–11.3 moles of liquid organic sulfoxide per mole of alkali metal acetylide or about 1.5 moles of alkali metal acetylide per liter of dimethyl sulfoxide; the reaction with carbon dioxide requires about 600 cc. of organic sulfoxide per mole of alkali metal acetylide or about 1.6 moles of alkali metal acetylide per liter of organic sulfoxide.

It has also been found that improved yields and conversions may be obtained if the reaction mixture is continuously saturated with acetylene, although the presence of acetylene gas is not required to carry out the objects of this invention. In addition, as pointed out above, it is generally desirable to add the organic compound reactable with the alkali metal acetylide to a mixture of liquid organic sulfoxide and alkali metal acetylide to prevent undesirable reactions such as aldolization, polymerization, hydrogenation or other decomposition reactions. Preferably, the organic compound reactable with the alkali metal acetylide is added portionwise at a rate sufficient to react with the alkali metal acetylide.

The following examples will serve to further illustrate my invention:

EXAMPLE 1

*Preparation of 3-Butyn-2-ol*

Dimethyl sulfoxide, 800 ml., (containing less than 0.01% water) was placed in a reaction vessel, which had been previously flushed with nitrogen. Dry sodium acetylide powder (2 moles) was added to the dimethyl sulfoxide, while stirring, and without exposure to the atmosphere. Acetylene gas was then bubbled through this mixture, and the temperature was brought to about 15°–16° C. After the mixture was saturated with acetylene, 3 moles of acetaldehyde were added portionwise over a period of three and one-half hours, while stirring vigorously. During this period the reaction temperature was maintained at 14°–16° C. The cooling bath was then removed and stirring was continued for thirty minutes during which time the temperature rose to 20° C. The reaction mixture was then poured slowly, with stirring into an ice-water mixture containing hydrochloric acid. Hydrochloric acid was added to maintain the water solution at a pH about 2–5 at all times. During hydrolysis the temperature was maintained below 30° C. The final pH was adjusted to 6–7; the total amount of acid and water used was 800 ml. The hydrolyzed solution was then continuously extracted with ether. After drying the ether extract over magnesium sulfate, the ether was distilled off. The remaining crude residue of 213 grams was fractionally distilled at 40–80 mm. pressure. Total yield of 3-butyn-2-ol: 125 g. (89% based on sodium acetylide).

EXAMPLE 2

*Preparation of 3-Butyn-2-ol*

Tetramethylene sulfoxide, 95 ml., was placed in a 500 ml., 3-neck, flask cooled by a "Dry-Ice" acetone bath. The flask was previously flushed with nitrogen. Dry powdered sodium acetylide, 15 g. (0.31 mole), was added to the tetramethylene sulfoxide, and the temperature of the reaction mixture was lowered to −18° C. Redistilled acetaldehyde, 22 grams (0.5 mole), was dropped into the mixture over a period of twenty minutes. The reaction temperature was maintained at −10° to −15° C., during this addition. The reaction mixture was then stirred for an hour at −5° to 5° C., and stirred for another twenty minutes at 10°–20° C., 100 cc. of an ammonium chloride solution containing 20 g. of $NH_4Cl$ was added slowly while the temperature was held below 25° C. The hydrolyzed reaction mixture was then extracted portionwise with 500 cc. of ethyl ether. The ether extract was dried over magnesium sulfate, the magnesium sulfate was filtered off, and the ether was distilled off through a 10″ packed column to a maximum pot temperature of 90° C. The residue containing 3-butyn-2-ol weighted 24 grams.

EXAMPLE 3

Preparation of 1-Hexyn-3-ol

Following a procedure similar to that given in Example 1, 26 g. of sodium acetylide (0.5 mole), was added to 200 ml. of dimethyl sulfoxide, stirred continuously, and saturated with acetylene. The temperature of the mixture was brought to 15° C., and 50 grams (0.7 moles), of redistilled butyraldehyde was added slowly to the acetylide-sulfoxide mixture over a period of thirty-five minutes. After all of the butyraldehyde had been added, stirring was continued for fifteen minutes. The reaction mixture was hydrolyzed with cold, dilute hydrochloric acid, and the hydrolyzed mixture extracted with ether. After drying, the ether was distilled from the extract and a 72 gram residue was obtained. Analysis indicated 61% 1-hexyn-3-ol, which is equivalent to a yield of 89% based on sodium acetylide.

EXAMPLE 4

Preparation of 3-Phenyl-1-Propyn-3-ol

The procedure used was substantially as given in Example 1. Dry powdered sodium acetylide, 55.9 grams (1.1 moles), was added to 400 cc. of dimethyl sulfoxide, the mixture was stirred continuously and saturated with acetylene gas. Benzaldehyde, 107 grams (1 mole), was added to the mixture over a period of two hours at 16°–20° C. After all of the benzaldehyde had been added, the reaction mixture was stirred for a period of one hour. The reaction mixture was hydrolyzed with a hydrochloric acid-ice water mixture. The hydrolyzed mixture was extracted with ether, and the ether distilled off. The residue obtained weighed 176.8 g. Distillation of this residue through a 12″ Vigreux column at 6.5–10 mm., 85°–123° C., yielded a distillate of 145.2 grams. Analysis indicated that this distillate contained 73.6% 3-phenyl-1-propyn-3-ol and 10.6% benzaldehyde. Conversion to 3-phenyl-1-propyn-3-ol based on sodium acetylide was 75.7%; based on benzaldehyde, the conversion was 83.4%. Recovery of 14.5% of the benzaldehyde indicated that the main cut yield was equivalent to a 95% yield based on benzaldehyde.

EXAMPLE 5

Preparation of 4-Hexen-1-yn-3-ol

The procedure employed in this example was essentially the same as that given in Example 1, except that 25.2 grams (0.5 mole) of sodium acetylide, 200 ml. of dimethyl sulfoxide, and 49 grams, (0.7 mole) of crotonaldehyde were used. The crotonaldehyde was added over a period of two and one-half hours and the reaction temperature maintained at 10°–12° C. After all of the crotonaldehyde had been added, the reaction mixture was stirred for an additional one-half hour. The reaction mixture was hydrolyzed with hydrochloric acid-ice water solution, and extracted with ether. The crude product, after the ether was distilled off, weighed 51.9 grams. Based on product analysis, conversion to 4-hexen-1-yn-3-ol based on sodium acetylide was 20.8%.

EXAMPLE 6

Preparation of 1-Furyl-Propynol

Following a procedure similar to that given in Example 1, 96 g. of a sodium acetylide-xylene mixture containing 1 mole of sodium acetylide, was added to 400 cc. of dimethyl sulfoxide. Furfural, 96 grams (1.0 mole), was then added to the mixture over a period of one and one-half hours, while the temperature was maintained at 15°–16° C. The reaction mixture was hydrolyzed, extracted with ether, and the ether distilled off to obtain a residue of 142.8 g. Analysis indicated that the crude residue contained about 50% 1-furyl-propynol by weight. Distillation of the crude residue yielded 64.0 grams of 1-furyl-propynol. Conversion based on furfural was 68%.

EXAMPLE 7

Preparation of 1-Pentyn-3-ol

Using a procedure similar to that of Example 1, 51.4 g., (1.0 mole), of sodium acetylide was added to 400 ml. of dimethyl sulfoxide. Propionaldehyde, 63.8 grams, (1.1 moles), was added portionwise to this mixture over a period of one hour and fifty minutes, while maintaining the reaction temperature at 15°–16° C. After all of the propionaldehyde was added, the reaction was continued for another hour, while stirring. The reaction mixture was hydrolyzed, extracted with ether, and the ether dried and distilled from the extract. Distillation of the crude residue yielded about 44.5 grams of 1-pentyn-3-ol. Conversion based on sodium acetylide was 53%.

EXAMPLE 8

Preparation of 2-Methyl-3-Butyn-2-ol

Dry powdered sodium acetylide, 7.0 grams, (0.134 mole), was added to 100 ml. of dimethyl sulfoxide. Acetone, 31.4 grams, (0.54 mole), was added to this mixture over a period of one hour and ten minutes and the reaction temperature was maintained at 12°–20° C. The reaction mixture was hydrolyzed with carbon dioxide and water at a temperature of 20° C. The hydrolyzed mixture was stirred for thirty minutes at room temperature, and the mixture was filtered. Distillation of the filtrate yielded 25.9 grams, analyzing as 70.6% 2-methyl-3-butyn-2-ol. This indicated a conversion of 40% based on acetone.

EXAMPLE 9

Preparation of 1-Hexyne

In a one-liter kettle was placed 0.5 mole of dry powdered sodium acetylide. Then 300 ml. of dimethyl sulfoxide were added and the temperature of the mixture lowered to 10° C. Redistilled n-butyl bromide in an amount of 72 g., (0.55 mole), was added incrementally while the temperature was maintained, with cooling, below 35° C. The reaction was continued, with stirring, for two hours after the butyl bromide had been added. The reaction mixture was then filtered and the filtrate was fractionally distilled through a 10″ glass helix packed column. Analysis of the distillate indicated a conversion to 1-hexyne of 74% based on sodium acetylide.

EXAMPLE 10

Preparation of 1-Hexyne

A 500 ml., 3-necked, flask, fitted with stirrer, dropping funnel, water cooling tower, Dry-Ice trap, and drying tower, was flushed completely with nitrogen. Dimethyl sulfoxide, 250 cc. was added, followed by 17 g., (0.336 mole), of sodium acetylide. Butyl chloride, 31.2 g.

(0.336 mole), was added portionwise with stirring over a fifty minute period through the dropping funnel. The reaction temperature was maintained at 18°–32° C. During the reaction an additional 200 cc. of dimethyl sulfoxide was added. The reaction was continued at room temperature for an additional five and one-half hours while stirring. The reaction mixture was distilled through a packed column at 50–150 mm. and a pot temperature of 60°–90° C. The crude product weighed 21 g. Analysis indicated a conversion of 64% to 1-hexyne.

EXAMPLE 11

*Preparation of 3-Butyn-1-ol*

A reaction vessel was flushed with nitrogen and 250 ml. of dimethyl sulfoxide was added. The solvent was saturated with acetylene. Dry powdered sodium acetylide, 16 grams (0.316 mole), was added all at once to the dimethyl sulfoxide while stirring. Ethylene oxide in an amount of 17 g. (0.385 mole) was added portionwise over a period of fifteen minutes. The reaction mixture was maintained at a temperature of 20°–25° C. during the addition of ethylene oxide. After all of the ethylene oxide was added, the reaction mixture was stirred for an additional thirty minutes at room temperature. The reaction mixture was then added slowly to a cold dilute hydrochloric acid solution composed of 30 cc. of concentrated hydrochloric acid and 225 g. of crushed ice. The resulting hydrolyzed solution was then continuously extracted with ether. The ether extract was dried over magnesium sulfate and the magnesium sulfate removed by filtration. The ether was removed from the extract by distillation and 18 grams of 3-butyn-1-ol was obtained in the residue. This is equivalent to a conversion of 81% based on sodium acetylide.

EXAMPLE 12

*Preparation of 1-Phenyl-3-Butyn-1-ol*

200 ml. of dimethyl sulfoxide was placed in a nitrogen flushed flask, then saturated with acetylene, and 15 g. (0.295 mole) of sodium acetylide were added with stirring. Styrene oxide, 40 g. (0.3 mole) was added to the mixture, portionwise, over a twenty minute period while maintaining the reaction temperature at 25°–30° C. The reaction mixture was stirred for another thirty minutes, until there was no further temperature rise. The reaction mixture was then hydrolyzed with dilute, cold hydrochloric acid. The hydrolyzed mixture was extracted with ether and the ether dried and distilled from the extract. A residue of 52 grams was obtained. Analysis indicated that this resdiue contained 76% by weight of 1-phenyl-3-butyn-1-ol. This is equivalent to a 92% yield based on sodium acetylide.

EXAMPLE 13

*Preparation of 4-Pentyn-2-ol*

A reaction vessel was flushed with nitrogen, filled with 210 ml. of dimethyl sulfoxide, and 16 g. (0.31 mole), of sodium acetylide were added to the dimethyl sulfoxide. The reaction temperature was maintained at 25°–30° C., while 26 g. (0.45 mole) of propylene oxide were added, portionwise, over a twenty minute period. The reaction mixture was stirred for an additional hour after all of the proylene oxide had been added. The reaction mixture was hydrolyzed with hydrochloric acid and crushed ice and the resultant mixture extracted with ether. The ether was dried and distilled from the extract. A residue of 31 grams was obtained. The conversion to 4-pentyn-2-ol by analysis of the extract was 80% based on sodium acetylide.

EXAMPLE 14

*Preparation of 2-Penten-4-yn-1-ol*

A 3-neck flask fitted with a stirrer and dropping funnel was flushed with nitrogen. Then 400 ml. of dimethyl sulfoxide was placed in the flask and saturated with acetylene. The mixture was cooled to 15°–20° C. and 25.5 g. (0.5 mole) of sodium acetylide was charged into the flask with stirring. Distilled epichlorhydrin, 23 g. (0.25 mole), was added over a thirty-six minute period through the dropping funnel. The temperature of the reaction mixture was maintained at 15°–17° C., during addition of the epichlorhydrin. After all of the epichlorhydrin had been added, the reaction mixture was stirred for another one-half hour. Then the reaction mixture was hydrolyzed with dilute, ice-cold hydrochloric acid. The hydrolyzed mixture was continuously extracted with ether, and the extract was dried over magnesium sulfate. After removal of the magnesium sulfate by filtration, the ether was distilled off to obtain a residue weighing 25.5 g. This residue analyzed as 30.8% 2-penten-4-yn-1-ol, indicating a conversion to pentenynol based on epichlorhydrin of 38.3%.

EXAMPLE 15

*Preparation of Acetylenic Acids*

A reaction vessel was flushed with nitrogen and 0.84 mole of sodium acetylide slurried in 648 g. of dimethyl sulfoxide were placed therein. Gaseous carbon dioxide was slowly added to the sodium-acetylide-dimethyl sulfoxide mixture, and the resulting mixture was constantly stirred. The mixture was maintained under a slight positive carbon dioxide pressure. After one and one-half hours, the rate of carbon dioxide had slowed down, and the carbon dioxide pressure on the reaction mixture was increased to about 4–5 p.s.i.g. at which pressure the reaction was continued for about an additional two hours. Throughout the reaction, the temperature of the reaction mixture was maintained at 15°–17° C. The conversion of sodium acetylide to the disodium salt of acetylene dicarboxylic acid was about 68% of theoretical, and the conversion to the sodium salt of propiolic acid was about 14% of theoretical.

It will be understood that the foregoing examples are merely illustrative and that various modifications thereof can be made without departing from the spirit and scope of this invention. For example, other organic compounds reactable with an alkali metal acetylide may be used; other liquid organic sulfoxides may be employed as the reaction medium; and still other modifications will suggest themselves to those skilled in the art. The invention is not to be limited except as defined in the appended claims.

What is claimed is:

1. In a process for reacting at a temperature between the freezing point of the reaction mixture and about 80° C. an alkali metal acetylide with an organic compound reactive with the acetylide to form a derivative retaining the acetylenic linkage selected from the group consisting of an unsubstituted hydrocarbon carbonyl compound, an unsubstituted alkylene oxide, an alkyl halide and carbon dioxide, the improvement of conducting said reaction in an inert liquid lower alkyl sulfoxide reaction medium.

2. A process as defined in claim 1, wherein said liquid organic sulfoxide is a member of the group consisting of dimethyl sulfoxide, diethyl sulfoxide, methyl ethyl sulfoxide, and tetramethylene sulfoxide.

3. A process as defined in claim 1, wherein said liquid organic sulfoxide is dimethyl sulfoxide.

4. A process as defined in claim 1, wherein said liquid organic sulfoxide is tetramethylene sulfoxide.

5. A process for preparing an acetylenic alcohol which comprises reacting at a temperature between the freezing point of the reaction mixture and about 80° C. an alkali metal acetylide with an unsubstituted hydrocarbon carbonyl compound in an inert liquid organic sulfoxide reaction medium.

6. A process as defined in claim 5, wherein said liquid organic sulfoxide is dimethyl sulfoxide.

7. A process for preparing an acetylenic alcohol which comprises reacting at a temperature between the freezing point of the reaction mixture and about 80° C. an alkali metal acetylide with an unsubstituted alkylene oxide in an inert liquid lower alkyl sulfoxide reaction medium.

8. A process as defined in claim 7, wherein said liquid organic sulfoxide is dimethyl sulfoxide.

9. A process for preparing an acetylenic hydrocarbon which comprises reacting at a temperature between the freezing point of the reaction mixture and about 80° C. an alkali metal acetylide with an alkyl halide in an inert liquid lower alkyl sulfoxide reaction medium.

10. A process as defined in claim 9, wherein said liquid organic sulfoxide is dimethyl sulfoxide.

11. A process for preparing an acetylenic acid which comprises reacting at a temperature between the freezing point of the reaction mixture and about 80° C. an alkali metal acetylide with carbon dioxide in an inert liquid lower alkyl sulfoxide reaction medium.

12. A process as defined in claim 11, wherein said liquid organic sulfoxide is dimethyl sulfoxide.

References Cited in the file of this patent

UNITED STATES PATENTS

| | | |
|---|---|---|
| 2,205,885 | Jackson et al. | June 25, 1940 |
| 2,435,524 | Weizmann | Feb. 3, 1948 |
| 2,487,007 | Walker et al. | Nov. 1, 1949 |
| 2,539,871 | Smedslund | Jan. 30, 1951 |

OTHER REFERENCES

Campbell et al.: J.A.C.S., vol. 60, pages 2882–84 (1938).

Henne, J.A.C.S., 67, 484–485 (1945).

Campbell, Org. Synthesis, 30, 15 (1950).

Petrov et al.: J. Gen. Chem. USSR, vol. 20, pages 289–294, English translation (pages 271–276 of the original) (1950).

Raphael: "Acetylenic Compounds in Organic Synthesis," 1955, pages 2, 3 and 13.

Fieser: Organic Chemistry, 1956, page 91.

Noller: Chemistry of Organic Compounds, 1957, pages 283–284.